(12) United States Patent
Mori et al.

(10) Patent No.: US 6,708,183 B1
(45) Date of Patent: Mar. 16, 2004

(54) SPATIAL INFORMATION SEARCH SYSTEM

(75) Inventors: Maki Mori, Toyonaka (JP); Koichi Homma, Yokohama (JP); Shuji Kitazawa, Tokyo (JP); Hiroshi Yajima, Suita (JP); Yoshiaki Yoshikawa, Ikoma (JP); Mitsuhiko Yoshimura, Settsu (JP); Chigusa Hamada, Inagi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/424,067

(22) PCT Filed: May 30, 1997

(86) PCT No.: PCT/JP97/01856

§ 371 (c)(1),
(2), (4) Date: Feb. 18, 2000

(87) PCT Pub. No.: WO98/54658

PCT Pub. Date: Dec. 3, 1998

(51) Int. Cl.⁷ .............................................. G06F 13/00
(52) U.S. Cl. ...................... 707/104.1; 707/102; 707/19; 709/217; 703/22
(58) Field of Search ............................ 703/22, 2; 707/3, 707/22, 102, 104, 9, 10, 104.1; 709/217; 345/431

(56) References Cited

U.S. PATENT DOCUMENTS

| | | | | |
|---|---|---|---|---|
| 5,701,467 A | * | 12/1997 | Freeston ...................... 395/611 |
| 5,911,139 A | * | 6/1999 | Jain et al. ....................... 707/3 |
| 5,973,466 A | * | 10/1999 | Nogami et al. ............. 318/569 |
| 6,084,595 A | * | 7/2000 | Bach et al. .................. 345/431 |
| 6,122,628 A | * | 9/2000 | Castelli et al. .................. 707/5 |
| 6,161,105 A | * | 12/2000 | Keighan et al. ............ 707/100 |
| 6,324,573 B1 | * | 11/2001 | Rhoads ......................... 709/217 |
| 6,338,056 B1 | * | 1/2002 | Dessloch et al. ............... 707/2 |

* cited by examiner

Primary Examiner—Samuel Broda
Assistant Examiner—Thai Phan
(74) Attorney, Agent, or Firm—Antonelli, Terry, Stout & Kraus, LLP

(57) ABSTRACT

It is an object of the present invention to provide a scheme for distributing spatial information between information providers and information users.

To achieve this object, the present invention creates a corresponding index for each spatial information. The index includes information related to a position included in spatial information, and data related to a storage location of the spatial information. This index also includes (1) a source ID for uniquely identifying spatial information; (2) coordinate translation values which are parameters used to correspond certain spatial information to other spatial information; and (3) when the spatial information including this index was created by referencing other spatial information, an underlay diagram specifying ID represented by the source ID possessed by the referenced spatial information, or the like.

23 Claims, 16 Drawing Sheets

FIG. 7

| 141 | 142 | 143 | 144 | 145 | 146 | 147 | 148 104 |
|---|---|---|---|---|---|---|---|
| INDEX | DATE AND TIME | LEVEL | UNIT PRICE | ALLOT-MENT RATE IS (%) | ALLOTMENT | NUM-BER OF REFER-ENCES | START ADDRESS |
| | | | | | DESTI-NATION | RATE (%) | | |
| B11 | | | | 100 | 15 | B | 45 | 1 | • |
| | | | | | | | | |
| | | | | | | | | |
| | | | | | | | | |
| | | | | | | | | |

| ALLOTMENT | |
|---|---|
| DESTI-NATION | RATE |
| A | 40 |
| | |
| | |
| | |
| | |

| USER ID | USER NAME | TELEPHONE NUMBER | ADDRESS | LEVEL | BALANCE |
|---------|-----------|------------------|---------|-------|---------|
|         |           |                  |         |       |         |
|         |           |                  |         |       |         |
|         |           |                  |         |       |         |
|         |           |                  |         |       |         |

(a)

INDEX STORE MENU SCREEN — 500

| | LIST | SEARCH | UPDATE | CONVERT |
|---|---|---|---|---|
| COMPANY | ***** | ****** | ****** | ***** |
| | @@@@@ | @@@@@@ | ++++++ | ****** |
| REGION | ##### | $$$$$$ | %%%%% | &&&&&& |

— 510

REQUEST/USER INFORMATION ENTRY FIELD — 520

DIGEST
TOTAL [ 531 ] ITEMS [ 532 ] YENS

| MENU ID | TITLE | CHARGE | PUR-CHASE | RESER-VATION |
|---|---|---|---|---|
| | | | | |
| | | | | |
| | | | | |

533  534  535  536  537

— 530

PAYMENT CONFIRMATION ENTRY FIELD — 540

(b)

DO YOU BUY [ ]
FOR [ ] YEN ?
DIGEST: [ ]
— 550

(c)

MAP OF ○○ — 560

FIG. 16
(a)
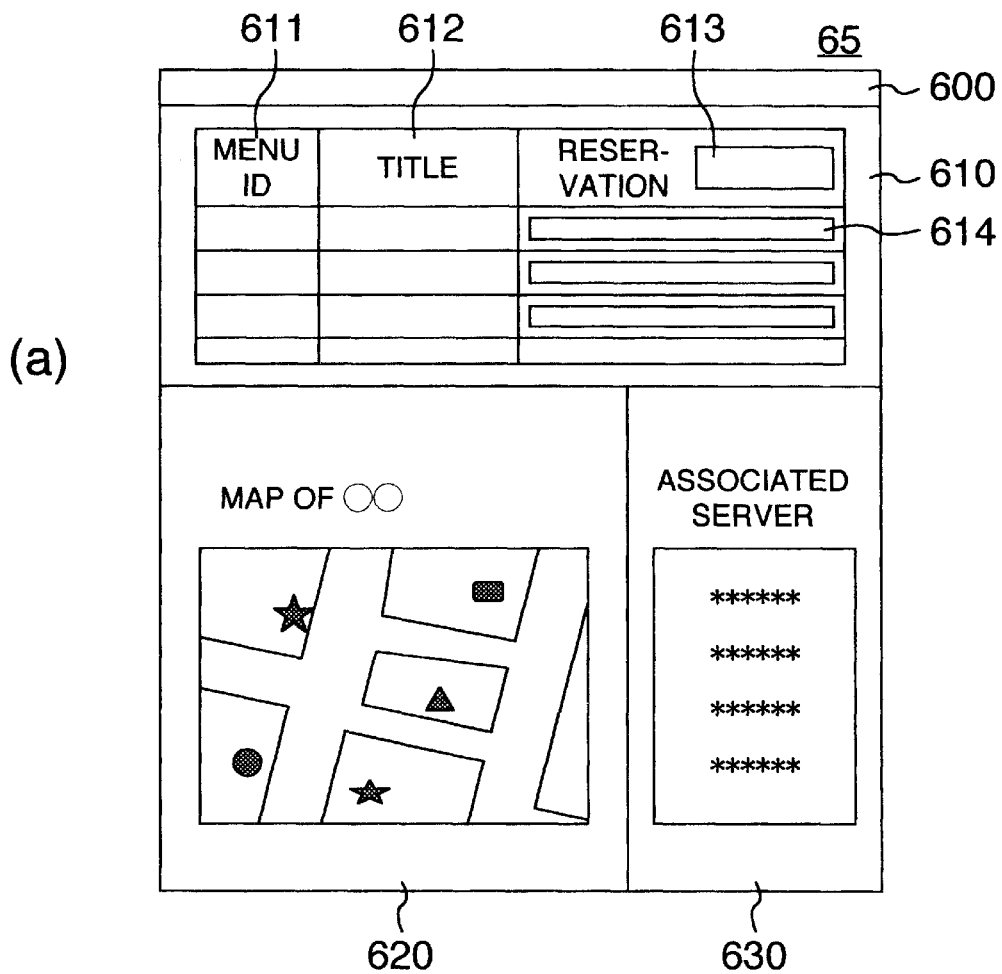
(b)
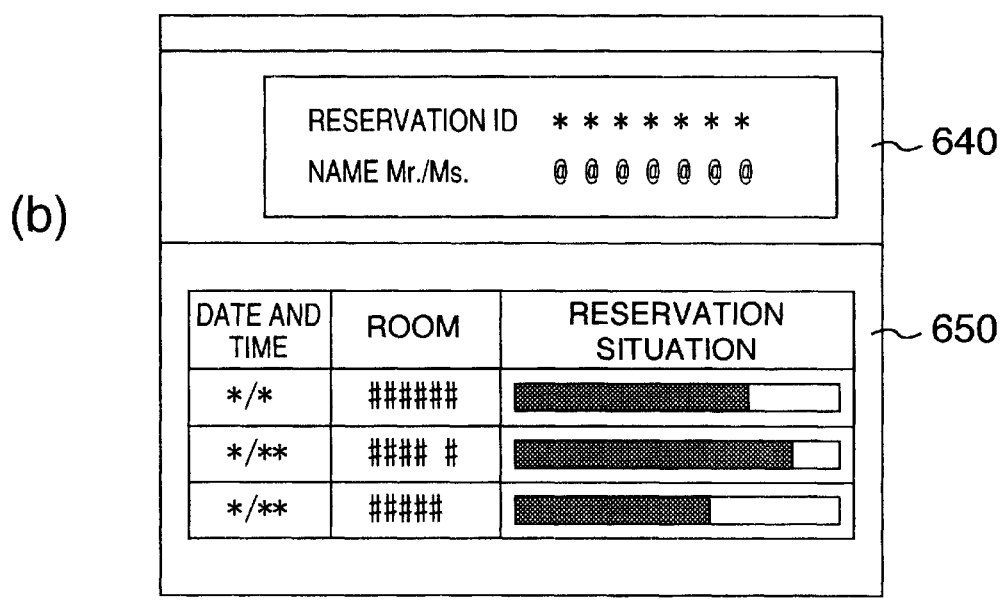

SPATIAL INFORMATION SEARCH SYSTEM

TECHNICAL FIELD

The present invention relates to techniques for integrally utilizing distributed information resources. More particularly, the present invention relates to a system which corresponds to a network for distributing spatial information, when the information resources are the spatial information including data related to positions, and to software for realization of the system.

BACKGROUND ART

Techniques for distributing geographical information include a national geographical spatial data clearing house (hereinafter abbreviated as the "clearing house") and meta data of geographical information, which are described in "Spatial Data Infrastructure Project and GIS," p80–p83, (published by the geographical information system society on Oct. 31, 1996).

The clearing house, which refers to a network for utilizing electronically connected geographical spatial data, is a general name of a plurality of distributed information providing organizations and facilities. It is thought that the clearing house will provide an effective means for finding information possessed by individual organizations because the clearing house has previously defined metadata, later described, so that it can distribute data related to the location of geographical information.

The metadata of geographical information describes location, conditions for utilization, geographical and temporal coverage, accuracy, items, attributes, original data, price, compatibility to utilization, and so on for a set of data, and the metadata of geographical information is described to be catalog-like information which is separated from a database system itself with an intention that it is independently distributed.

The aforementioned prior art, however, does not describe any technical resolution for transmission and reception between an information providing server and an information utilizing server when geographical information is utilized.

The prior art does not either consider any method for providing new map data with reference to previously provided map data.

The present invention is a method of distributing spatial information. This spatial information is defined as described later.

It is an object of the present invention to provide a scheme for distributing spatial information between information providers and information users.

DISCLOSURE OF INVENTION

The present invention can achieve the above object by creating a corresponding index for each spatial information. Here, the spatial information refers to data which has data related to a spatial position and which can corresponds other spatial information with the data related to the position. Also, the index includes information related to a position included in spatial information, and data related to a storage location of the spatial information. This index also includes (1) a source ID for uniquely identifying spatial information; (2) coordinate translation values which are parameters used to correspond certain spatial information to other spatial information; and (3) when the spatial information including this index has been created by referencing other spatial information, an underlay diagram specifying ID represented by the source ID possessed by the referenced spatial information, or the like. The underlay diagram is spatial information that serves as geographical reference for certain spatial information, and need not be a drawing.

Also, the present invention presents a menu which is a set of one or more options (information) each corresponding to spatial information. The menu may be provided by a computer which searches for spatial information, or a computer which provides spatial information, or a computer which provides articles or services utilizing spatial information when the user is to acquire desired spatial information. Also, by using the menu, the user can search spatial information, acquire spatial information, and obtain an article or a service introduced by spatial information. The options refer to data, each of which is corresponded to spatial information, and serves as a key for searching for spatial information. It can therefore be said that an option represents data which is used for inputting and outputting data necessary to search for spatial information, or the data.

A more specific configuration of the present invention is as follows. Spatial information corresponding to one or more options selected from a presented menu is displayed. In this event, the selection of an option (menu) may be made by a user of the present invention or on the system side in accordance with certain criteria. In addition, indexes may be included in the options, or indexes themselves may be used as options.

Alternatively, instead of directly displaying spatial information after an option has been selected, associated information associated with the selected option may be displayed. Displayed associated information may be displayed together with displayed spatial information, or spatial information corresponding to a newly selected one may be displayed from among displayed associated information.

The associated information links an option (menu) to spatial information. As the associated information, there is a digest. The digest is a collection of one or more data within spatial information which are open to public without special conditions. Indexes may be included therein, or indexes themselves may be used as digest information. In addition, summaries of associated information (including summaries of images) may be included in a digest, or a summary itself may be used as a digest. The digest may be presented separately corresponding to a plurality of spatial information.

Furthermore, digests may be used as options. First, digests are presented, and spatial information is displayed corresponding to a selected one from the presented digests. The digests may be presented separately corresponding to a plurality of spatial information.

For realizing the above-mentioned present invention on computers connected to a network, the following configuration may be used. A second computer having indexes (which may not have digests if the digests are not identical to the indexes) retrieves spatial information corresponding to a selected index from a first computer (storage device) which stores spatial information, and presents it to a predetermined computer. At this time, the index may be selected by anyone, such as the user of the third computer, the third computer itself, or the like. Also, the predetermined computer may be other than the third computer. For presenting spatial information from the first computer to the third computer, it is not a concern whether or not the spatial information should pass the second computer. Also, the present invention includes a configuration for sending to the user of the third computer using a medium, not through a network.

Further, a navigation apparatus may be included as the first computer. In this case, the first computer is notified of a change in spatial information such as a change in road situation (including the presence or absence of construction), and a change in map information or the like. By incorporating the contents of such changes in indexes, spatial information desired by the user of the navigation apparatus can also be made available (such as spatial information including a traffic jam situation predicted at present or in future, and spatial information including the least time-consuming route to a destination).

Also, by using indexes, the same type or different types of spatial information can be integrated more easily and accurately. When using an electronized version of information described on a paper as spatial information, an index "indicating how it was electronized (coordinate translation) or the like" is created during the electronization, such that the index is utilized to match a plurality of spatial information for integration. Also, visual data such as photographs and movies can be similarly integrated by taking imaged locations, imaged orientations, and so on as indexes.

Further, by using indexes, it is possible to perform processing desired by the user of the third computer on a fourth computer (which may be the same as the first computer) associated with spatial information presented on the third computer. The desired processing may include delivery of new information from the fourth computer to the third computer; conducting electronic shopping through the fourth computer (including the reception of a desired service); and execution of a procedure for receiving a desired service (reservation of a facility and so on) through the fourth computer.

Furthermore, when information indicative of the value of spatial information is included in the index, per unit accounting can also be adopted for spatial information from the third computer. Also, by incorporating quotation and reference relationship with spatial information in the index, per unit accounting can also be applied to a quoting or referencing party of the spatial information. In this event, the per unit accounting can be applied to a quoting or referencing party through the second quoting stage or the like, even if quotation or reference is made the second or more quoting stage as long as the extraction and reference relationship is incorporated.

BRIEF DESCRIPTION OF DRAWINGS

FIG. 7 is a table configuration diagram showing a data structure for a charge distribution table.

FIG. 8 is a table configuration diagram showing a data structure for a user management table.

FIG. 16 is an example of a digest and a response displayed on the screen in the user client.

BEST MODE FOR CARRYING OUT THE INVENTION

One embodiment of the present invention will hereinafter be described in detail with reference to the accompanying drawings. In this embodiment, map data and contents data are taken as examples of spatial information. As objects of this embodiment, the following are included in addition to the aforementioned object: (1) to provide a method of more efficiently transmitting and receiving desired spatial information for distributing the spatial information; (2) to also provide a method of transmitting and receiving an exchange medium (money or the like) between an information provider and a requester for distributing the spatial information; and (3) to provide a system through which one can readily know an update situation, when spatial information has been updated, other than a computer which has created the updated spatial information.

The map data refers to data for displaying and outputting the following objects with characters and symbols using a computer. The objects refer to those which can be components within spatial information, and include therein tracks such as roads and railways; facilities and buildings such as stations, airports, ports and so on; and geographical features such as mountains, rivers, lakes and marshes, oceans, and so on. On a large scale map or the like, there are poles, indicators, semaphores and roadside trees as objects. Depending on the object of utilizing a map, underground buried facilities such as water pipes, gas pipes, sewer pipes, conduits for communications, conduits for electric power lines, and so on can also be objects. Further, regions represented by blocks determined by the administration are also treated as objects. While a map is generally represented on a plane surface, those which can be three-dimensionally represented using a computer are also included herein in map data.

The contents data refers to data which represents attribute information related to an object represented by map data. For example, the contents data may be the name of houseowner, address and telephone number of a building described on a map; the name, business type, open hour and available articles of a store described on a map; and so on, by way of example.

In addition, the spatial information may include work drawings, drawings, aerial photographs, satellite images, photographs, CAD drawings, moving images, and so on.

Figure 1:
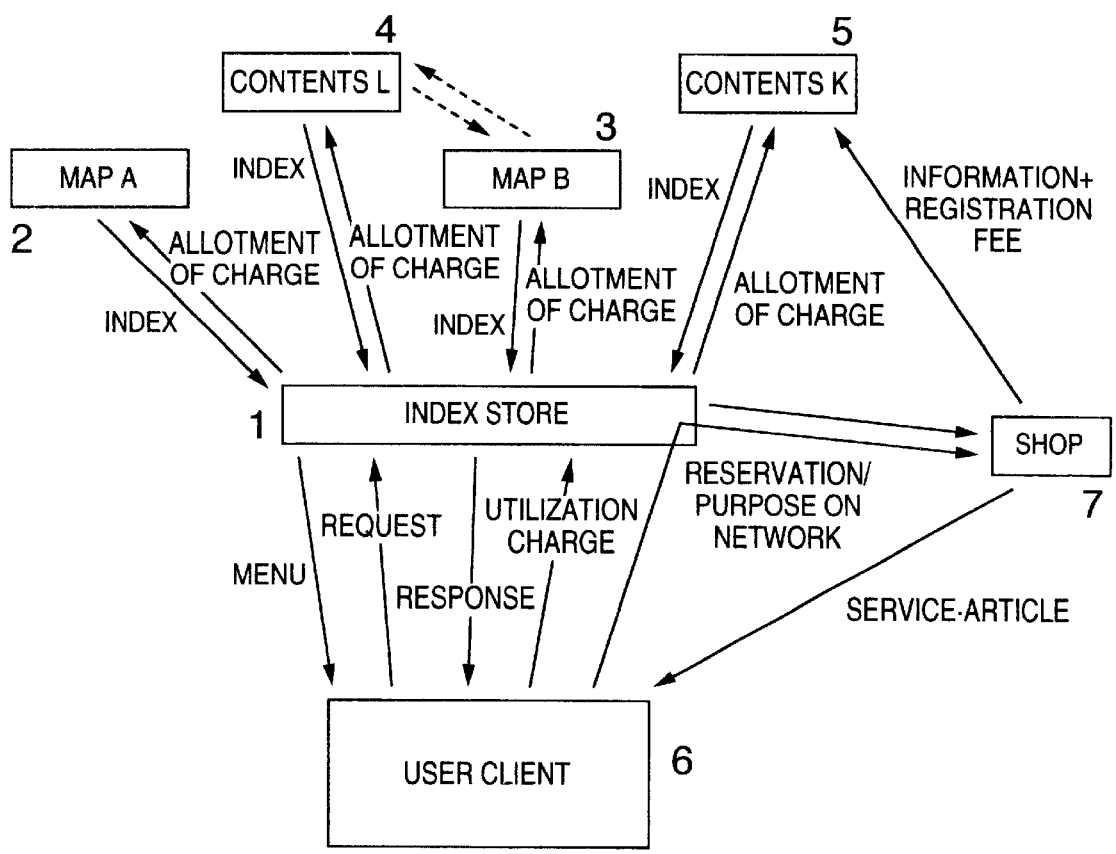
FIG. 1 is a diagram illustrating an outline of the present invention.

First, the outline of a system for distributing spatial information will be explained with reference to FIG. 1. The spatial information described in this embodiment is created by map servers 2, 3 and contents servers 4, 5 as map data or contents data, and provided to users. When a provider and a creator are different, data for specifying each of the provider and the creator is included in data included in an index, later described. The index included in the map data or contents data is created by a map server or a contents server, and sent to an index store 1, later described. Alternatively, the index may be created in an index store, wherein the index store creates a menu based on indexes sent thereto for providing the menu to a user client 6. The user client 6 references the menu, requests desired information to the index store 1, and obtains a response. In this event, the response (spatial information) is charged. If the user of the user client agrees to payment, data indicating that a charge will be paid for the response is transmitted from the user client 6 to the index store 1. The index store 1 transmits data indicating that a portion of the charge is paid to the map server and the contents server which created the spatial information provided to the user client as the response, based on the data sent from the user client and a value in a previously provided table.

When the user references information obtained through the response from the index store to access the shop client 7, the user may obtain a service from a shop client from that which would be obtained when the user accesses the shop client 7 without referencing the information obtained through the response.

In the following, the functions and processing contents of the index store, indexes, menu, user client and shop client will be explained in detail with reference to FIGS. 2 to 16.

Figure 2:
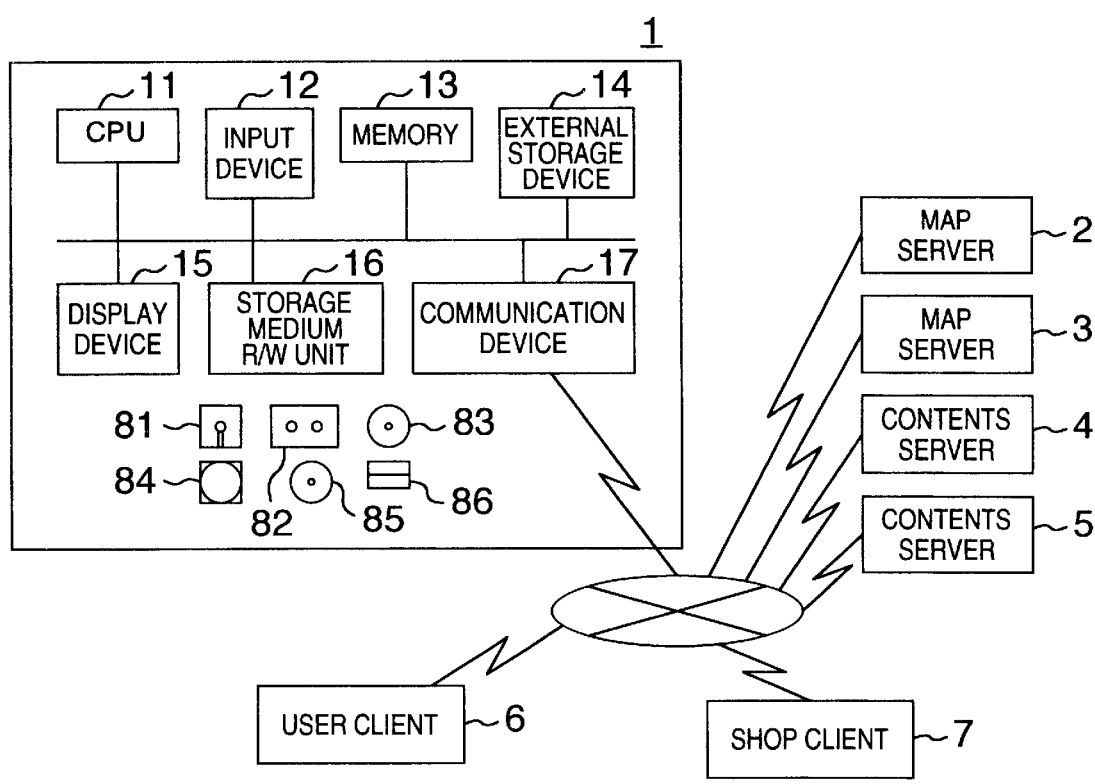
FIG. 2 is a diagram of a system configuration in which the present invention is implemented.

FIG. 2 is a diagram of a system configuration or the present system. As illustrated, the index store 1, map servers 2, 3, contents servers 4, 5, user client 6, and shop client 7 are interconnected through a network 9. While one each of user client and shop client is illustrated, a plurality of user clients and shop clients may be connected. While FIG. 2 illustrates only the index store 1 in detail, the remaining map servers 2, 3, contents servers 4, 5, use server 6 have similar configurations. The shop client 7, which also has substantially a similar configuration, further includes a bar code read/write unit.

The index store 1 has a central processing unit 10, an input device 11, a memory 12, an external storage device 13, a display device 14, a storage medium read/write unit 15, and a communication device 16, all of which are interconnected through a system bus.

The map server 2 has a central processing unit 20, an input device 21, a memory 22, an external storage device 23, a display device 24, a storage medium read/write unit 25, and a communication device 26, all of which are interconnected through a system bus. The map server 3 has a central processing unit 30, an input device 31, a memory 32, an external storage device 33, a display device 34, a storage medium read/write unit 35, and a communication device 36, all of which are interconnected through a system bus. The contents server 4 has a central processing unit 40, an input device 41, a memory 42, an external storage device 43, a display device 44, a storage medium read/write unit 45, and a communication device 46, all of which are interconnected through a system bus. The contents server 5 has a central processing unit 50, an input device 51, a memory 52, an external storage device 53, a display device 54, a storage medium read/write unit 55, and a communication device 56, all of which are interconnected through a system bus. The user client 6 has a central processing unit 60, an input device 61, a memory 62, an external storage device 63, a display device 64, a storage medium read/write unit 65, and a communication device 66, all of which are interconnected through a system bus. The shop client 7 has a central processing unit 70, an input device 71, a memory 72, an external storage device 73, a display device 74, a storage medium read/write unit 75, a communication device 76, and a barcode read/write unit 77, all of which are interconnected through a system bus. The storage medium stores map data and contents data. The storage medium may be a floppy disk 81, a magnetic tape 82, a CD-ROM 83, a magneto-optical disk 84, an IC card 85, a DVD 86, and so on, and at least one of them may be used.

While the foregoing computers each have a display device as an output device, map data and contents data may be outputted using a speaker or a printer as an output device, though not shown.

Figure 3:
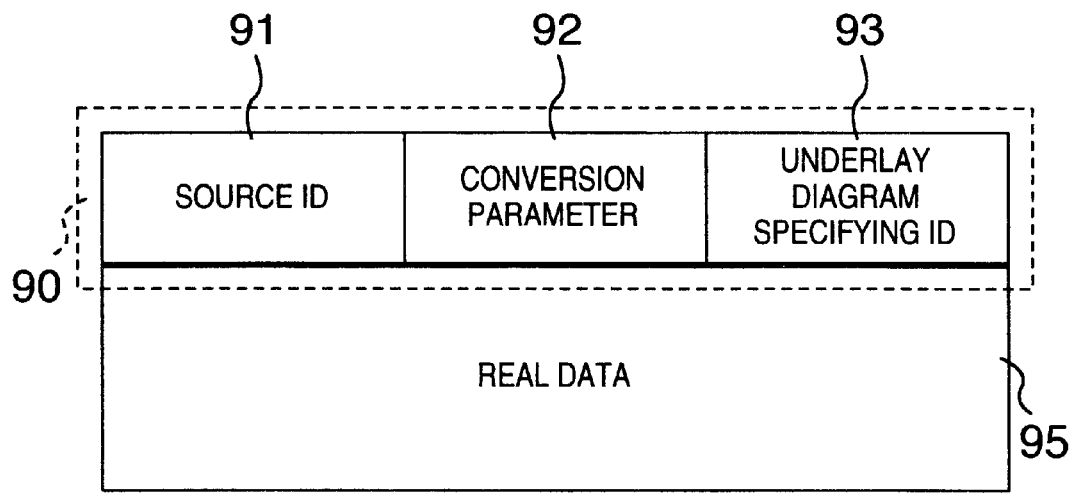
FIG. 3 is a diagram showing a data structure for spatial information.

FIG. 3 is a diagram showing a data structure for the spatial information. The spatial information consists of data referred to as an index 90, and real data 95 which is particular to respective spatial information. The index is composed of a source ID 91, conversion parameters 92, and an underlay diagram specifying ID 93. A data structure for the real data is defined by the conversion parameters 92.

The source ID is an ID for uniquely managing each spatial information. For example, the source ID may be a combination of URL of a WWW server and an ID uniquely managed in the server, or may be combined with created date and time or a transmission date and time. Also, the source ID may include data related to an access right for spatial information identified by the source ID itself.

The conversion parameters are parameters which were used when the spatial information was created, and are data required when the spatial data is converted to another data storage scheme. For example, the conversion parameters may be draftsmanship, scale, orientation, coordinate system, resolution, data for specifying a region such as information related to the position of a point defined as a base, and so on, created date and time, date and time of data measurement and investigation, a valid period of data, expiration date and time of data, a version, reference for data, and so on. Also, when spatial information is a photograph, it has an imaged location, an imaged orientation, and imaged angle as conversion parameters. Further, colors in individually created images (drawings) have not been mutually adjusted in such a manner that colors are selectively used in consideration of colors in other images (drawings). Thus, when a plurality of images (drawings) are overlapped or arranged side by side for display, the respective images may be confusing and hard to identify. For this reason, data related to used colors may be provided as one of conversion parameters. Also, for accommodating a case where real data is composed of several layers, or a case where data included in real data are classified, data indicating which layers the real data has or which categories the real data has may be provided. Further, the conversion parameters may include the amount of data in spatial information.

The underlay diagram specifying ID is a source ID of spatial information which was referenced when spatial information identified by a source ID was created. Its data structure is the same as that of the source ID. By combining the source ID and the underlay diagram specifying ID, it is possible to know data which was extracted when data was created, and an organization which had created the extracted data. By possessing the underlay drawing specifying ID in the index, it is possible to specify spatial information which is positional reliance for spatial information identified by the source ID.

The following files may be separately stored in a plurality of external storage devices, or completely or partially stored on a memory without using external storage devices, provided that the memory has a sufficient capacity. Also, the program may not reside on a memory but may be stored in an external storage device and read into the memory upon starting up the system or as required.

Figure 4:
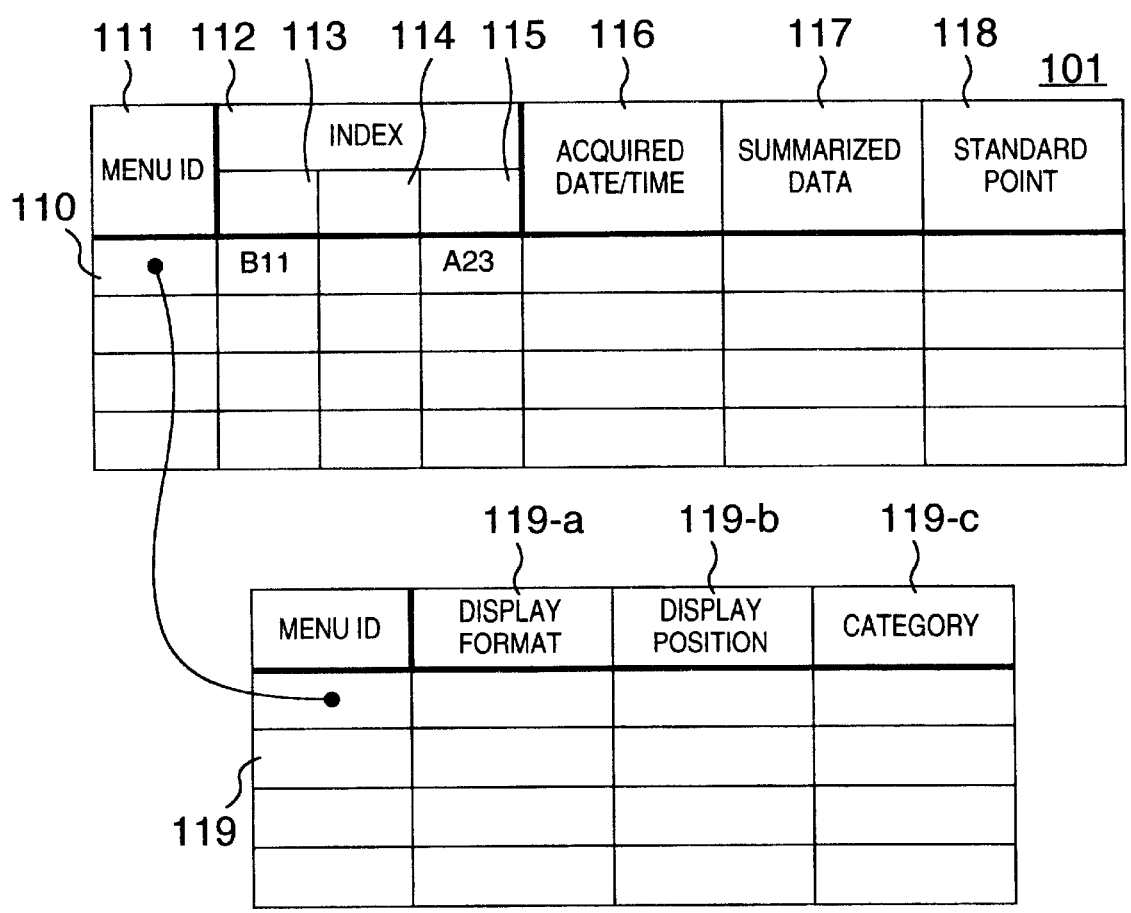
FIG. 4 is a table configuration diagram showing a data structure for a menu table.
Figure 5:
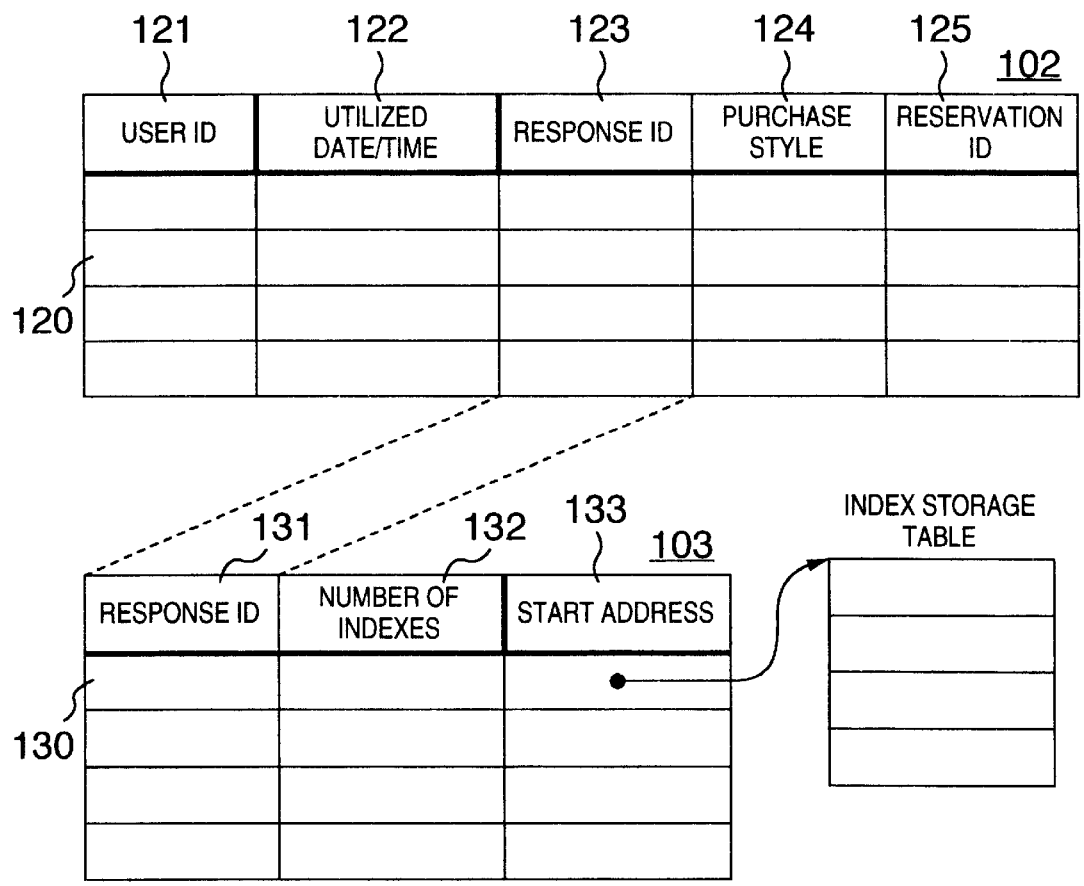
FIG. 5 is a table configuration diagram showing a data structure for a utilization situation table.

A menu file 101 stores menu tables 110 and 119 which were created on the basis of indexes obtained from the map server and the contents server. The structure of the menu table will be explained with reference to FIG. 4. The menu table has portions 110 and 119: a table 110 for storing data necessary to display a menu, and a table 119 for storing data provided to the user as a menu. FIG. 4 shows exemplary table structures of the respective tables. The table 110 is composed of columns labeled as Menu ID 111 for uniquely managing a menu; Index 112; Acquired Date and Time 116; Summarized Data of Real Data 117; and Standard Point 118, while Index 112 is composed of columns labeled as Source ID 113; Conversion Parameter 114; and Underlay Diagram Specifying ID 115. FIG. 4 shows that spatial information having B11 set in Source ID is created with reference to spatial information having A23 as ID. Assume that the spatial information B11 was created by a company "B" and has "11" as a uniquely managed number within "B." Likewise, assume that spatial information having A23 as ID is spatial information of "number 23" created by a company "A."

The table 119 is composed of columns labeled as Display Format 119-*a* for indicating in which mode data stored in the table 110 are displayed as a menu; Display Position 119-*b* for indicating where the data are displayed in the menu; and a Category 119-*c* when data obtained by referencing the Index 112 have been classified in accordance with a predefined classification method, in addition to Menu ID representative of a correspondence relationship with the table 110.

While the summarized data of real data is stored as a single table as shown in FIG. 4, it may be stored as a separate table when the summarized data is image data or the like. Also, it goes without saying that the table 110 and the table 119 are managed as a single table.

A utilization situation file 102 stores a utilization situation table 120 that stores data indicating when and which user has obtained which search result in which purchase style (for example, a sale style in which a search result is received as a response, a reservation style in which after a search has been executed, a search result is not received but the result is preserved in the index store, and so on). While details on a search result may be stored in a response file 103 as a response table, they may be stored in the same file. The structure of the utilization situation table and the structure of the response table will be explained with reference to FIG. 5.

The utilization situation table 120 is composed of columns labeled as User ID 121; Utilized Date and Time 122; Response ID 123; Purchase Style 124; and Reservation ID 125. The response table 130 is composed of columns labeled as Response ID 131; Number of Indexes 132 included in the response; and Start Address 133 of an index storage table. Data related to indexes are stored in a region corresponding to an address indicated in the column 133 within the index storage table.

Figure 6:
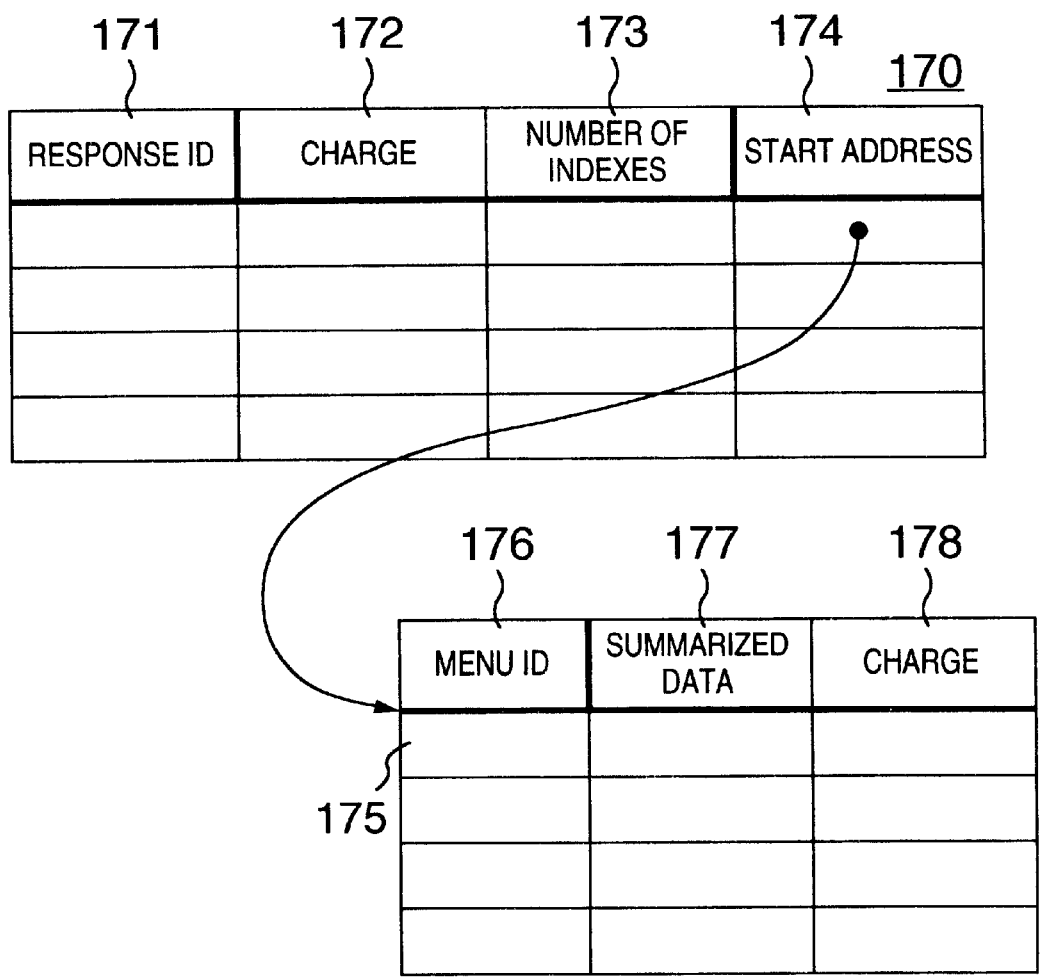
FIG. 6 is a table configuration diagram showing a data structure for a charge list table.

A digest table 170, as shown in FIG. 6, is composed of columns labeled as Response ID 171; Amount of Charge 172 required to obtain the contents of the response; Number of Hit Indexes (spatial information) 173 as a result of a search; and Start Address 174 of a summarized data storage table. The summarized data storage table 175, which stores the contents included in each Response ID, is composed of columns labeled as Menu ID 176; Summarized Data 177 for the Menu ID 176; and Charge 178.

An allotment file 104 stores an allotment table 140 that indicates which spatial information is provided to users for how much charge and in which period, and at which rate the charge is allotted to who (which servers). The structure of the allotment file 104 will be explained with reference to FIG. 7.

The allotment table 140 is composed of columns labeled as Index 141; Price Valid Period 142; Level of User 143 to which a price is applied; Charge 144 on the user for spatial information; Allotment Rate 145 of Charge to Index Store; Destination and Charge Allotment Rate 146 for a server which created data provided to the user; Number of Data 147 referenced until data provided to the user was created; Start Address 148 to a table which stores a referenced destination and allotment rate; and Table 150 which stores a referenced destination and allotment rate.

The allotment table has at least columns which store an identifier for uniquely identifying spatial information; a utilization charge for utilizing the spatial information; a allotment rate for a server which created the spatial information, and the name of the server; and a allotment rate for the index store.

A client management file 106 stores a client management table 160 which stores user's personal information for each user. The personal information may include user name; telephone number; address; utilization frequency up to now; a client level in accordance with utilization charges; a balance of recent utilization charge; and so on. The structure of the client management table will be explained with reference also to FIG. 8.

The client management table 160 is composed of columns labeled as User ID 161; User Name 162; Telephone Number 163; Address 164; User Level 165; and Balance 166 of recent utilization charge.

Referring to the drawing, explanation will be given of an example in which a user uses the present system to access a menu in the index store and obtain a map B created with a map A used as an underlay drawing, as a response corresponding to a request of the user, pay a charge for utilization of the map B, and access a shop client found on the map B.

Figure 9:
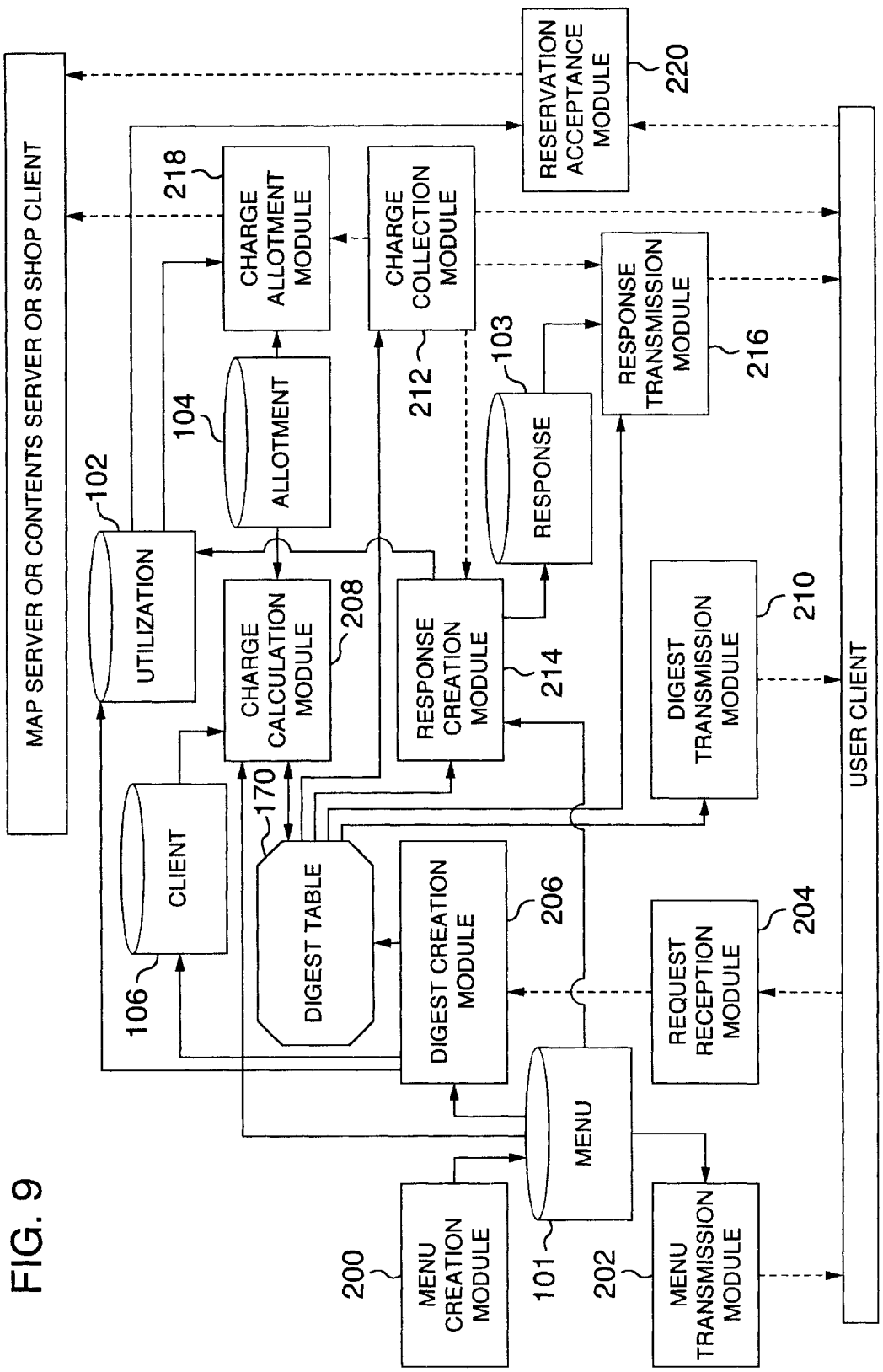
FIG. 9 is a modular configuration diagram illustrating relationships between modules included in an index store.

First, a relationship between the respective files shown in FIGS. 4 to 7, used in the index store, and modules possessed by the index store will be explained with reference to FIG. 9.

First, the menu file 101 used in the index store is created in a menu creation module 200 based on indexes which have been previously obtained from a map server and a contents server. The menu called herein is utilized when the user is to reference spatial information to determine which spatial information should be referenced. The menu includes one or more options. The options are respectively corresponded to spatial information, and refer to data which can serve as indexes for searching for spatial information. The menu file is a file that stores data which is referenced when this menu is displayed and when a digest and a response are created at a later time.

Date and time at which indexes were obtained are stored in the column labeled as Acquired Date and Time 116. This acquired date and time can be used to examine whether or not data stored in the map server and the contents server have been updated for offering a service of providing the user or servers with an update situation. Summarized Data may be created in a menu creation module of the index store based on the contents of the map server and the contents server, other than data previously provided by the map server and the contents server which are obtained as Summarized Data. Also, data stored in Category 119-c is referenced when spatial data identified by each index is classified and provided to users. The data of this category may be created simultaneously when the above-mentioned summarized data is created. Data stored in Standard Point is referenced as a representative point when data identified by respective indexes are spatially arranged for displaying them in a menu of the index store. In doing so, different spatial information can be used as larger spatial information by patching such information just in a similar manner to cut and paste of paper.

A menu transmission module 202 references the menu file 101 created by the menu creation module, and transmits data related to a menu in response to a request from the user. The user, even without given any special right, can access this menu. When the user references the menu thus created to request a search, the contents of the request is received by a request reception module 204. In this event, information related to the user is also received. The information related to the user may be received simultaneously with the search request, the user may be authenticated by providing a separate module for confirming the user.

The contents of the request received by the request reception module 204 is sent to a digest creation module 206. A digest is a collection of generally opened data within spatial information requested by a user client. Also, the digest is information related to a table of contents processed in the index store for spatial information requested from a user client.

The digest creation module 206 references pertinent indexes from the menu file 101 based on the request from the user, and stores menu IDs of the pertinent indexes and summarized data together with a response ID in a digest table. The response ID is automatically assigned a unique value by the digest creation module. Also, with reference to Menu ID 176 of the digest table, indexes of the menu file, the allotment file and a client file, a charge calculation module 208 calculates a charge 178 for each index, and a charge 172 for each response ID which is calculated on the basis of the value of this charge 178, and stores these values in the digest table. The allotment file stores a use charge for each index. In this event, when the use charge is varied depending on levels by which users are divided into groups according to the use frequency or the like, the client file 106 is referenced. When the referenced client management file 106 shows a previously registered user, the information related to the user and an identifier for identifying a response are stored in the utilization situation file 102. If the client file 106 does not contain the name of the user who has accessed, the information related to the user is stored in the utilization situation file 102 as well as in the client file 106.

The digest transmission module 210 transmits the contents of the digest table 170 to the user client. The user, upon receiving the digest, can confirm which data can be obtained for the request, whereas information providers can prevent the user from illegally acquiring data for which they want to claim the copyright.

When a charge collection module 212 receives data for confirming for which data in the digest the user client will make a payment for the use charge, the contents of a response file 103 created by a response creation module 214, and a response ID and charge stored in the digest table 170 are combined, and these data are transmitted to the user client by a response transmission module 216.

The response creation module 214 references the digest table 170, the indexes stored in the menu file 101, and the map server and the contents server based on the indexes, creates the result of a search corresponding to the search request, and stores the result in the response file 103. In this event, the response creation module 214 assigns a reservation ID, later described, to the result, and stores them in the response file. The response creation module 214 has stored as to which user has purchased which information and when. Purchase methods include a method of paying a charge each time; a method of previously paying a charge for a fixed period; a method of once paying a charge for predetermined information without the need for paying additional charges irrespective of how many times the information is referenced; and so on. While FIG. 5 does not explicitly show a table for storing data acquired in the map server and the contents server within the data created by the response creation module, such a table is also created as required.

A charge allotment module 218 references the utilization situation file 102 and the allotment file 104 to allot charges to pertinent servers. For example, in FIG. 7, spatial information with an index source ID "B11" has "100" determined as a unit price. Within the utilization charge of this spatial information, the index store has a share of 15%; a server "B" which created spatial information "B11" used by the user has a share of "45"; and a server "A" which had created spatial information referenced by the server "B" when it created the spatial information "B11" has a share of "40." The number of references indicates the number of spatial information which had been referenced until spatial information utilized by the user was created, and is calculated on the basis of the index.

As a method of confirming a payment for a utilization charge for spatial information, approaches such as electronic settlement, electronic money, or the like may be used. Also, not only data transmitted and received between a user client and the index store but also data transmitted and received through a network may be encrypted. Of course, it goes without saying that in this case, transmitting and receiving computers should comprise an encryption module and a decryption module.

A reservation acceptance module 220 determines that a reservation can be made when the result of a search transmitted by the response transmission module 216 includes data for providing a method of accessing a shop client, and transmits the aforementioned reservation ID to pertinent shop clients. Further, when data related to confirmation of the reservation from a shop client is transmitted within a fixed period of time, the shop client is given a share of a charge. This allotment processing may be performed in the charge allotment module 218.

Figure 10:
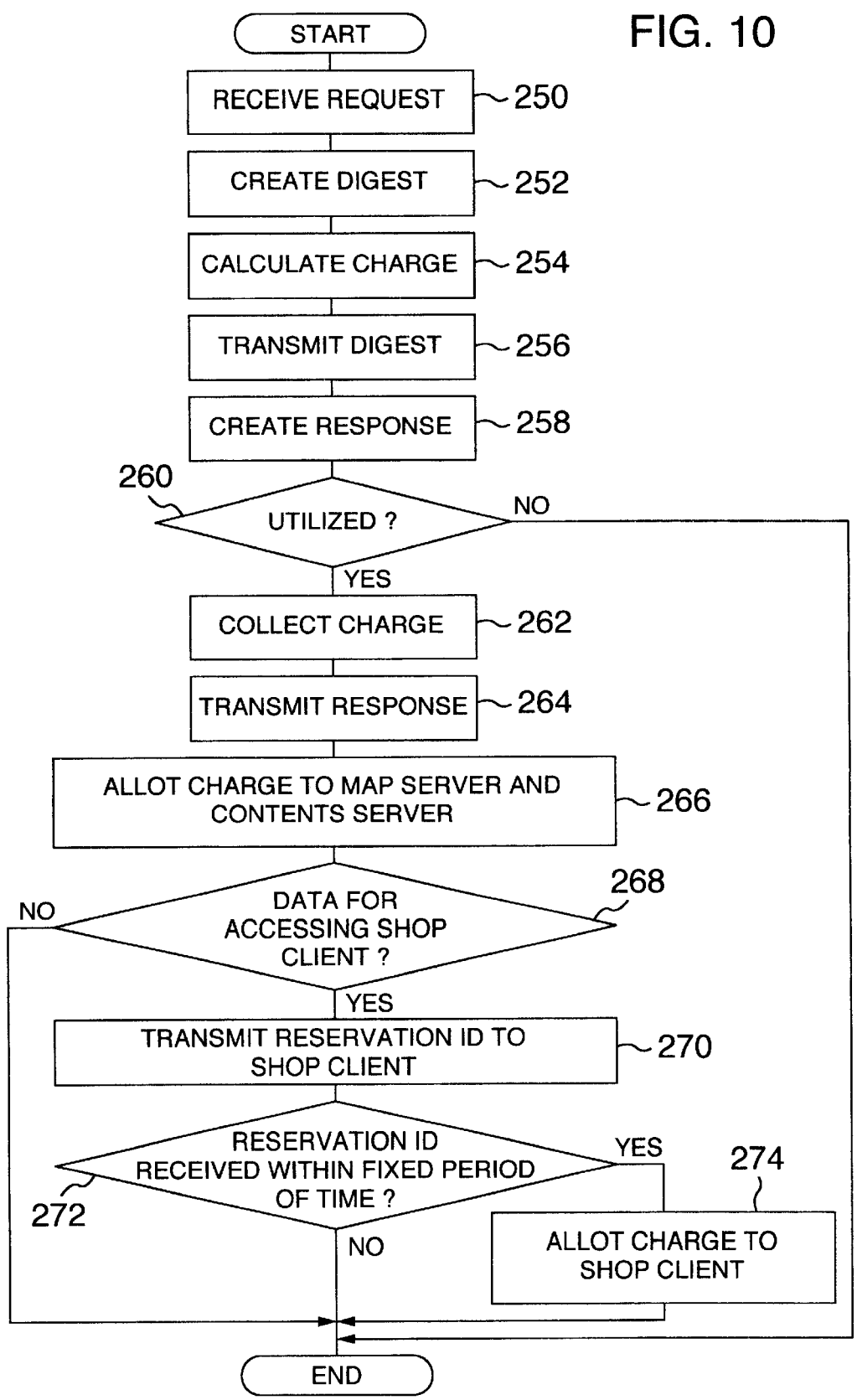
FIG. 10 is a flow chart illustrating an example of how to utilize spatial information according to the present invention.
Figure 11:
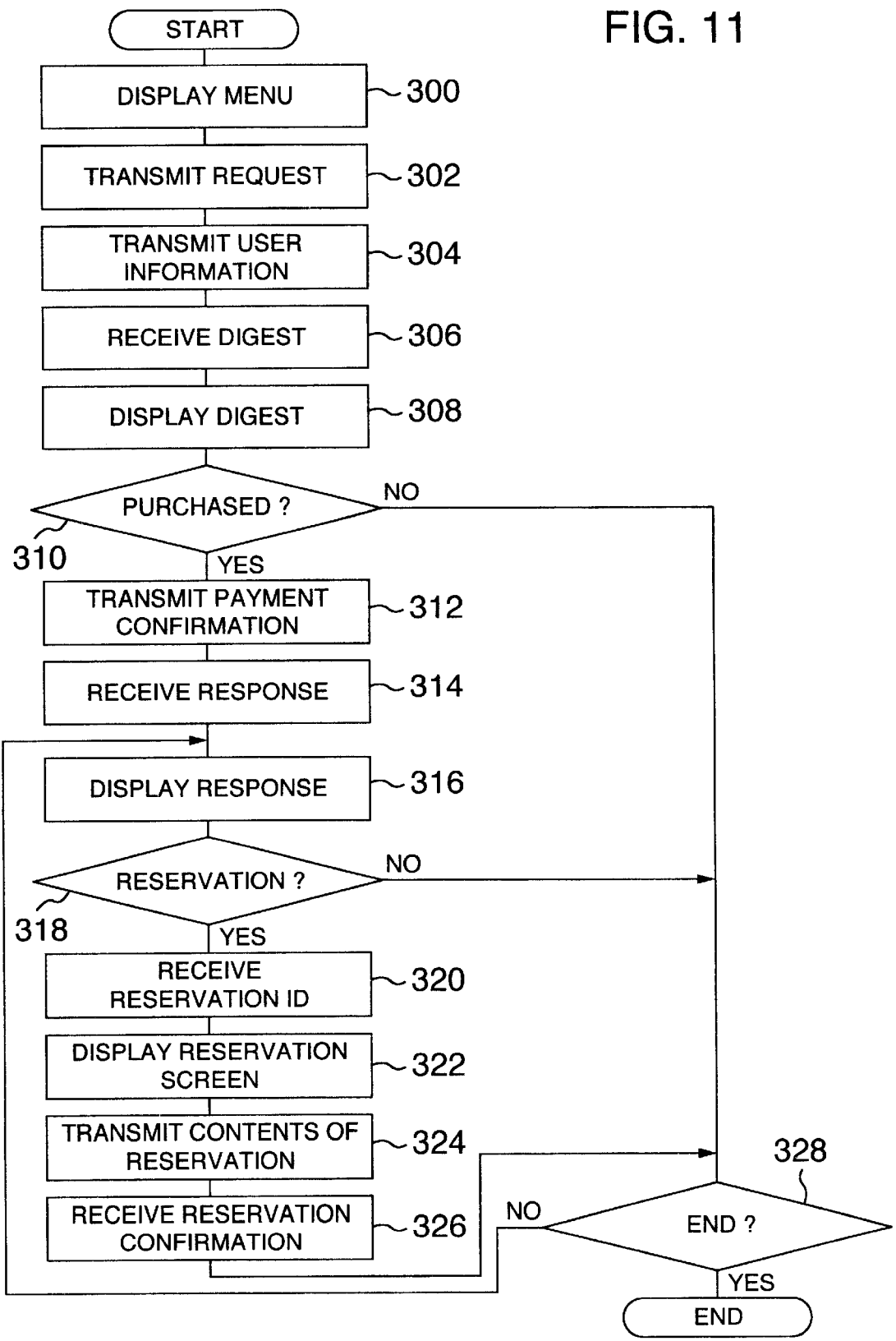
FIG. 11 is a flow chart illustrating an example of how to utilize spatial information according to the present invention.
Figure 12:
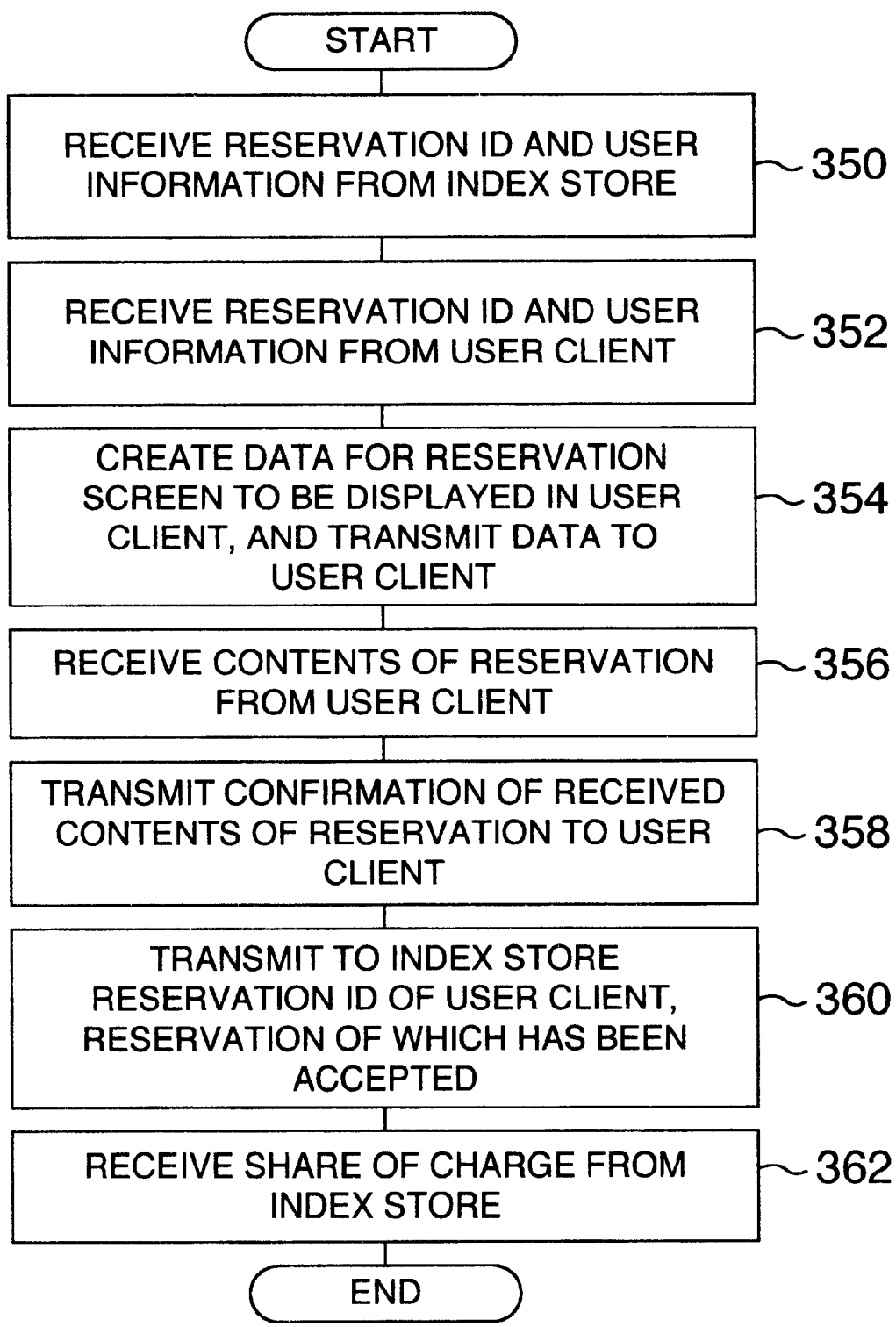
FIG. 12 is a flow chart illustrating an example of how to utilize spatial information according to the present invention.

The flow of processing executed in the index store will be explained with reference to FIG. 10. At step 250, a search request and user information, transmitted from the user, are received. The user is making a search request or the like through a menu transmitted to the user by the menu transmission module 202. Step 252 creates a digest table 170 in the digest creation module 206 based on the data transmitted from the user and the menu 101.

As examples of digests, the following may be contemplated: (1) data representing the contents of spatial information in the form of characters is used as a digest; and (2) when spatial information is a map or an image, data having a reduced amount of data is used as a digest. By reducing the amount of data, the amount of information is reduced when the spatial information is displayed or outputted. For example, an image outputted as a digest may get blurred. In another case, when spatial information has a structure divided into several layers, only a portion of layers may be outputted. In doing so, information providers can let the user know which information they can provide, and can prevent providing information to users who do not pay a utilization charge. Also, while the digest may be outputted to a display device, data may be processed using a printer such that its details cannot be outputted.

Step 254 calculates in the charge calculation module 208 a utilization charge for utilizing spatial information requested by the user with reference to the digest table 170, the menu table 101, the client file 106 and the allotment file 104. Step 256 transmits data of the digest table 170 created at step 252 and step 254 by the digest transmission module 210 based on the user information received at step 250 or the client file 106. Step 258 references the menu file 101 and the digest table 170 to access a map server and a contents server based on indexes stored in the menu file 101 for creating a response corresponding to the search request. Here, when the response is created, the index store obtains spatial information corresponding to the search request from the user from the map server and the contents server, and transmits it to the user as a response. However, when the amount of data contained in the map server and the contents server is large, indexes or the like may be provided to the user, while detailed data on maps and contents may be directly transmitted from the map server and the contents server as a response. In this event, the index store transmits combined data of the user information and the search request to the map server and the contents server, so that the map server and the contents server transmit the responses based thereon. Also, when the responses are transmitted, update situations in the map server and the contents server are transmitted as parts of the responses. In doing so, the user can know the update situations of the servers which have desired spatial information, so that it is possible to prevent accessing again spatial information which had once been accessed and has not been updated after the access.

Step 260 determines in the charge collection module 212 whether or not a response result is transmitted to the user, based on data transmitted from the user indicating whether or not the user will utilize. The flow proceeds to step 262 when the user will utilize, and is terminated when the user will not utilize. Step 258 and step 260 may be in the reverse order, in which case, the response is created on the basis of data for confirming the utilization from the user. When step 258 is executed first, the response can be transmitted to the user earlier because the response can be created while the user is confirming the contents of the digest. Conversely, when step 260 is executed first, information utilized by the user is only created as the response, so that data not utilized by the user will not be created.

Step 262 receives data from the user client for confirming that the user will pay the charge in the charge collection module 212. Step 264 transmits the response file created at step 258 to the user client in the response transmission module 216. Step 266 allots the charge to the index store, the map server and the content server in the charge allotment module 218.

Step 268 determines whether or not data for accessing a shop client is included in data stored in the response file. The flow proceeds to step 270 when included, and is terminated when not included. Step 270 transmits the reservation ID created at step 258 to the shop client. Step 272 determines whether or not data related to confirmation of the reservation is sent from the shop client within a fixed period of time. The flow proceeds to step 274 when sent, and is terminated when not sent. Step 274 allots a portion of the utilization charge received by the index store, or the charge to the shop client in accordance with a predetermined rate or amount in the charge allotment module 218.

The user client 6 has a menu display module, a user information input/transmission module, a request input/transmission module, a digest display module, and a charge payment module. The flow of processing executed in the respective modules will be explained with reference to FIG. 11 and exemplary screens in FIG. 15 and FIG. 16.

Figure 15:
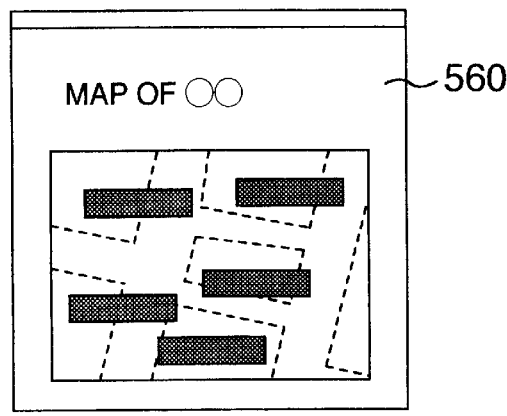
FIG. 15 is an example of a menu displayed on a screen in a user client.

Step 300 receives in the menu display module data transmitted by the menu transmission module 202 of the index store 1, and displays a menu on a display device 65. An exemplary screen of a displayed menu is illustrated in FIG. 15(a). In FIG. 15, a field 500 for displaying the contents of the menu includes a option display field 510; a field 520 into which a search request or information related to the user is entered by the user; a field 530 for displaying the contents of a digest; and an entry field 540 for the user to confirm that the user purchases spatial information. The field 530 for displaying the contents of a digest may not be included in the filed 500 for displaying the contents of a menu, and instead a display screen 560 as illustrated in FIG. 15(b) may be displayed together with FIG. 15(a) when a purchase is confirmed.

Step 302 and step 304 transmit the contents entered by the user in the field 520 to the index store 1 in the user information input/transmission module and the request input/transmission module.

Step 306 receives data transmitted by the digest transmission module 210 of the index store 1.

Step 308 displays the contents of the digest in the digest display field 530 based on the data received at step 306. For example, as illustrated in FIG. 15(a), "the number of data pertinent to the contents requested by the user," "the amount of charge required to utilize the data," and "summarized data representative of the contents of the pertinent data" are displayed. The summarized data is data different from data obtained when it is purchased, and may be character data such as a title and a summary from which the contents can be generally known, image data, or a combination of them. FIG. 15(c) illustrates an example of image data. Image data obtained as summarized data differs from the image data illustrated in FIG. 16 in that it is blurred when displayed, or detailed data are not displayed. Although the entire screen is displayed as blurred, a portion of the screen may be clearly displayed. By thus displaying, the quality of information can be presented to the user. Also, a data structure may be provided such that while the screen displaying this image data may be printed as a print screen, the data cannot be printed in detail.

Step 310 determines whether or not the user has specified spatial information to purchase. The flow proceeds to step 312 when spatial information to be purchased has been specified. When not specified, it is determined whether or not the process is terminated. The flow returns to step 308 when the process is not terminated, and is terminated when it is terminated. As a method of determining whether or not the process is terminated or not, there is a method of displaying a dialog for asking whether the process may be terminated, when no entry has been received for a fixed period of time, and terminating the process after receiving the confirmation of the termination entered from the user.

As a method with which the user specifies which spatial information is purchased, there is a method of entering the fact that the user has selected in a column "Purchase" 536.

Step 312 transmits data indicating which spatial information is the data for which it has been confirmed that the user would pay a charge for purchasing the spatial information, and data indicating that the payment has been confirmed for the spatial information. For example, a dialog is displayed as shown in FIG. 15(b) to confirm the payment using a password or the like entered by the user. This method of confirming the payment may use methods such as electronic money and electronic settlement.

Step 314 receives a response from the index store 1 or the map server 3 which creates, possesses and manages spatial information. Also, a reservation ID, later described, is received from the index store 1.

Step 316 displays a received response on the display device 65. An exemplary display produced on the screen is illustrated in FIG. 16.

Menu ID 611 indicates the ID of spatial information purchased by the user, and Title 612 is a field for displaying a title representative of the spatial information. If no specific title has been determined, a portion of digest may be utilized. A field 613 is the reservation ID which is entered when a reservation or the like is made to a shop client. Referring to this ID, the shop client provides the user with a service. A field 614 is a field for accepting an input for displaying spatial information in a field 620. The field 620 displays spatial information. While one type of spatial information is herein displayed, a plurality of spatial information may be simultaneously displayed. In this event, spatial information is displayed in a corresponding manner with reference to indexes. For display, they may be overlapped. However, if a correspondence relationship cannot be clearly provided, they may be displayed side by side, and an input for the correspondence relationship by the user is awaited such that they are displayed in accordance with the input from the user. The field 630 displays spatial information which references the same spatial information with reference to the indexes. In this way, it is possible to list spatial information corresponded to the same map.

From step 318, the flow proceeds to step 320 if the user enters an input indicating that reservation is made, and proceeds to step 328 if the user enters an input indicating that reservation is not made or that the process is terminated. The input from the user indicating that reservation is made may be performed, for example, by a method of specifying any of symbols displayed in the map display field 620 in FIG. 16. Alternatively, fields for accessing the associated map server, contents server and shop client may be provided such that an input is made to these fields. The respective fields have marks displayed for accessing other computers, so that an input is made for the mark to transmit the location of the user's computer on the network and a reservation ID to a destination computer at step 320.

Step 322 displays a reservation screen in response to the transmitted reservation ID based on data sent from the shop client. The contents displayed on the screen may be, for example, a list of articles available at the shop client; a reservation situation for reserving date and time at which a service is provided, when the shop client provides the service; a login screen for conducting electronic shopping; and so on.

Step 324 transmits data inputted by the user to the shop client together with the reservation ID, based on the contents displayed at step 322.

Step 326 receives from the shop client data related to confirmation that a reservation, purchase of an article, or the like has been received.

The flow proceeds to step 316 if step 328 does not determine whether or not there is an input from the user for termination, and is terminated if there is.

The shop client has a reservation acceptance module, a reservation result transmission module, and a charge reception module. The flow of processing executed by the respective modules will be explained with reference to FIG. 12.

Step 350 receives the reservation ID transmitted at step 270 in the index store 1, and user information.

Step 352 receives the reservation ID and the user information from the user client 6.

Step 354 collates the reservation IDs and the user information received at step 350 and step 352, and transmits to the user client data for displaying a screen through which a reservation is accepted. For example, the reservation ID and user's personal information, after encrypted, are sent from the index store, while the reservation ID, the user's name and so on are sent from the user client. By collating these data, the personal information sent from the index store is decrypted. The decrypted data is referenced to create data such as an article list possessed by the shop client, a reservation situation, and so on which are transmitted to the user client.

Step 356 receives the reserved contents from the user client 6.

Step 358 transmits to the user client 6 data with which the shop client 7 has confirmed the reservation from the user client 6.

Step 360 transmits to the index store 1 data indicating that the reservation has been accepted, together with the user ID, from the user client 6.

Step 362 receives from the index store 1 data indicating that the charge will be paid to the shop client.

Figure 13:
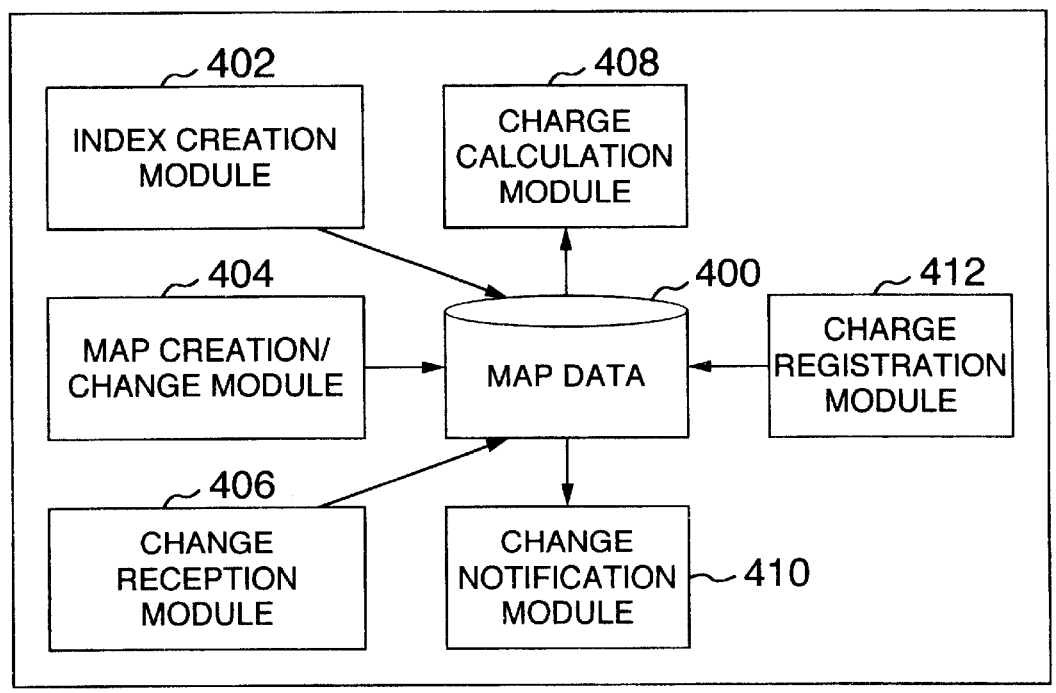
FIG. 13 is a modular configuration diagram illustrating a map server.

The map server has an index creation module, a charge registration module, a map data change notification module, and a spatial information change reception module, as shown in FIG. 13. Map data 400 is created by the index creation module 402 and a map creation/change module 404. When data is sent from another server indicating that a change has been made, the data is received by the change reception module 406, and the map data 400 is updated on the basis of the received data. The charge calculation module 408 calculates a charge for utilizing the map data with reference to the map data for an inquiry from the index store or another server, and transmits a response to the computer which has made the inquiry. The change notification module 410, when the map data has been updated, transmits the fact that the change has been made, changed date and time, and changed contents to the index store and previously registered servers. The charge registration module 412 is a module for registering and changing charges for utilizing the map data.

Figure 14:
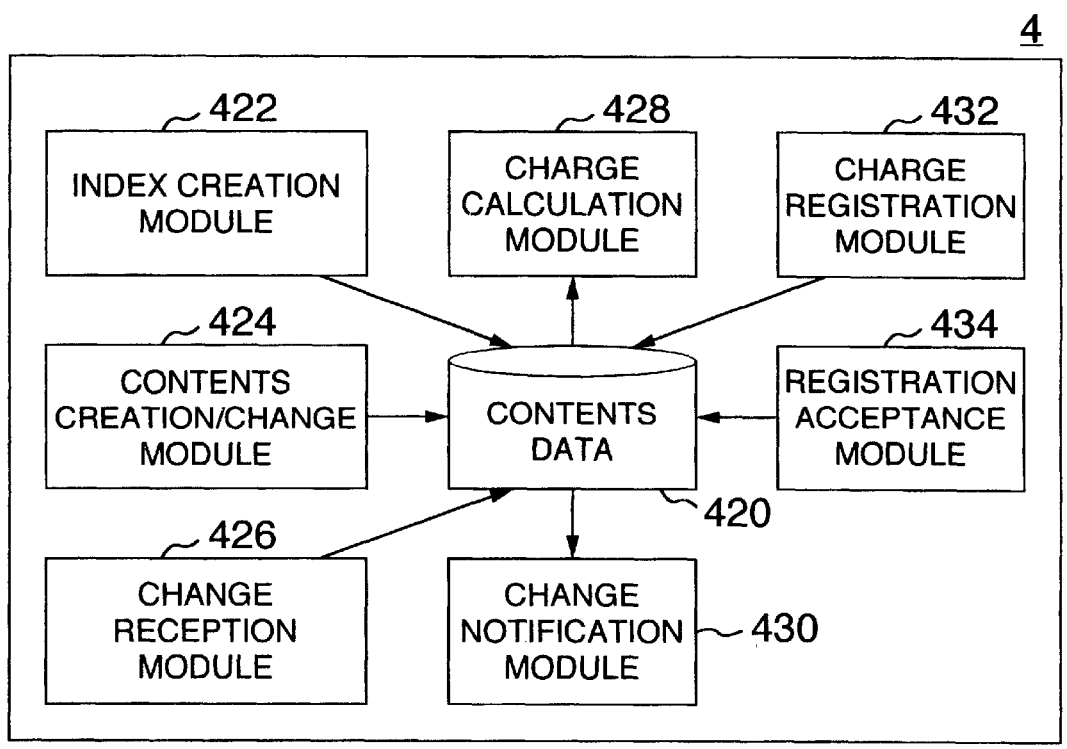
FIG. 14 is a modular configuration diagram of a contents server.

The contents server has an index creation module 422, a contents creation/change module 424, a change reception module 426, a charge calculation module 428, a change notification module 430, a charge registration module 432, and a registration acceptance module 434, as shown in FIG. 14. Since modules 422–432 are similar to the respective modules of the map server, and differ only in that data treated thereby are contents or maps, so that explanation is omitted. The registration acceptance module 434 is a module for linking data possessed by the shop client from the shop client to contents data 420.

According to this embodiment, since data representative of the value for spatial information can be communicated between a party which utilizes the spatial information, a party which mediates the spatial information, and a party which provides the spatial information, in accordance with the distribution of the spatial information through a network, it is possible to provide an accounting scheme involved in the distribution of the spatial information through the network.

According to this embodiment, by providing spatial information with data for mutually converting spatial information, the spatial information can be connected to create new data and value.

According to this embodiment, by providing spatial information with data indicating that the spatial information has been extracted, a charge obtained by accounting can be allotted even to a party which has created the extracted spatial information, thereby making it possible to provide a method of protecting the copyright for the extracted spatial information.

INDUSTRIAL APPLICABILITY

According to the present invention, even if different methods are required for accessing each of servers which possess spatial information in order to search and utilize the spatial information, according to the present invention, the user need not know how to access each of the servers which possess the spatial information.

As described above, the present invention enables integrated utilization of distributed spatial information resources.

What is claimed is:

1. A spatial information search system comprising:

one or more data supply servers which supply spatial information having data related to a spatial position, said spatial information capable of being corresponded to other spatial information by said data;

an intermediation server which stores indexes including access destinations of said one or more data supply servers supplying said spatial information; and a user terminal which is provided with options corresponding to said indexes and capable of serving as indicators for searching for spatial information, wherein the intermediation server is connected to the one or more data supply servers and the user terminal, via a network, to intermediate the distribution of spatial information to the user terminal, and is configured to access said one or more data supply servers based on an index corresponding to an option selected by the user terminal, to search said spatial information and to supply said spatial information to the user terminal.

2. A spatial information search system according to claim 1, wherein said spatial information searched is displayed on the user terminal.

3. A spatial information search system according to claim 1, wherein:

summaries of spatial information corresponding to options selected by the user terminal are presented to said one or more data supply servers; and spatial information corresponding to a summary selected from the presented summaries is provided as a search result.

4. An intermediate server connected to one or more data supply servers and at least one user terminal, via a network, for distributing spatial information among the data supply servers and the user terminal, said intermediate server comprising:

means connected to one or more data supply servers which supply spatial information having data related to spatial positions and capable of being corresponded to other spatial information by said data, and connected to at least one user terminal which issues a search request for the spatial information;

storage means for storing indexes including access destinations of the one or more data supply servers supplying the spatial information; and control means for accessing the one or more data supply servers and for searching and providing the spatial information to the user terminal, in response to the search request for the spatial information from the user terminal.

5. An intermediate server according to claim 4, wherein each of said indexes includes an access destination of spatial information referred to by said spatial information.

6. An intermediate server according to claim 4, wherein said storage means stores summaries indicative of contents of the spatial information corresponding to said indexes.

7. An intermediate server according to claim 4, further comprising:

means for presenting options corresponding to said indexes to the user terminal and capable of serving as indicators for searching for spatial information; and means for searching for spatial information corresponding to an option selected by the user terminal from said one or more data supply servers.

8. An intermediate server according to claim 7, wherein:

said means for searching presents a summary corresponding to a selected option and indicative of the contents of said spatial information to the user terminal; and said spatial information corresponding to the selected summary within the presented summaries is provided as a search result.

9. An intermediate server according to claim 8, wherein said spatial information as searched is provided to the user terminal for a visual display.

10. An intermediate server according to claim 8, wherein said the user terminal is a search request computer.

11. An intermediate server according to claim 10, wherein said control means forces another computer associated with said searched spatial information to perform processing in accordance with instructions from said search request computer on separately requested spatial information within said searched spatial information.

12. An intermediate server according to claim 7, wherein:

contents of a change in spatial information such as a change in road situation, a change in map information, or the like are incorporated in a respective index, and at least one of spatial information including a traffic jam situation predicted at present or in future, and spatial information including the least time-consuming route to a destination, as said spatial information, is used as a search result.

13. An intermediate server according to claim 7, wherein:

at least one of an imaged location and an imaged direction of image data is included in a respective index; and said spatial information which has said image incorporated in map data is provided as a search result.

14. An intermediate server according to claim 7, wherein:

information indicative of the value of spatial information is included in a respective index; and a per unit accounting is allowed to be applied to a search result of said spatial information.

15. An intermediate server according to claim 14, wherein:
- each of said indexes includes quotation information related to reference of said spatial information; and
- said per unit accounting is allowed to be applied also to spatial information which is extracted or referenced for said search result.

16. An intermediate server according to claim 15, wherein:
- said quotation information includes information related to at least referenced spatial information through two or more intervening stages; and
- said per unit accounting is allowed to be applied also to spatial information which is quoted or referenced for said search result through two or more intervening stages.

17. A computer readable medium comprising instructions that, when executed by a computer system connected in a network including one or more data supply servers and at least one user terminal, cause the computer system to:
- store indexes including access destinations of one or more data supply servers which supply spatial information having data related to spatial positions and capable of being corresponded to other spatial information by said data;
- present options corresponding to said indexes and capable of serving as indicators for searching for spatial information to the user terminal which issues a search request; and
- search for spatial information corresponding to an option selected by the user terminal from said one or more data supply servers.

18. A computer readable medium comprising instructions that, when executed by a computer system connected in a network including one or more data supply servers and at least one user terminal, cause the computer system to:
- store an index including an access destination of at least one data supply server supplying spatial information, wherein said spatial information contains data related to a spatial position, and is capable of being corresponded to other spatial information by said data;
- present an option corresponding to said index to the user terminal;
- search for spatial information from said one or more data supply servers that corresponds to the option selected by the user terminal; and
- supply spatial information searched to the user terminal.

19. A computer readable medium according to claim 18, wherein said index includes information related to at least a referencing party of said spatial information.

20. A computer readable medium according to claim 18, wherein said index includes a summary having at least a portion of the contents of said spatial information.

21. A spatial information system comprising:
- one or more spatial information providers to provide spatial information including data related to a spatial position;
- at least one user terminal provided with an option for searching for spatial information; and
- an intermediate server connected to one or more spatial information providers and the user terminal, via a network, to intermediate the distribution of spatial information among the spatial information providers and the user terminal,
- wherein said intermediate server is configured to store an index including an access destination of one or more spatial information providers, to access said one or more spatial information providers based on an index corresponding to an option selected by the user terminal, to search for spatial information from said one or more spatial information providers that corresponds to the option selected by the user terminal, and to supply searched spatial information to the user terminal.

22. A spatial information system according to claim 21, wherein the spatial information includes map data representing objects with characters and symbols, and content data representing attribute information related to an object represented by said map data.

23. A spatial information system according to claim 22, wherein the index included in the map data or content data is created by either the intermediate server or one of the spatial information providers for storage in the intermediate server for use by the user terminal.

* * * * *